No. 827,917. PATENTED AUG. 7, 1906.
I. KITSEE.
ELECTRIC CELL.
APPLICATION FILED FEB. 20, 1904.
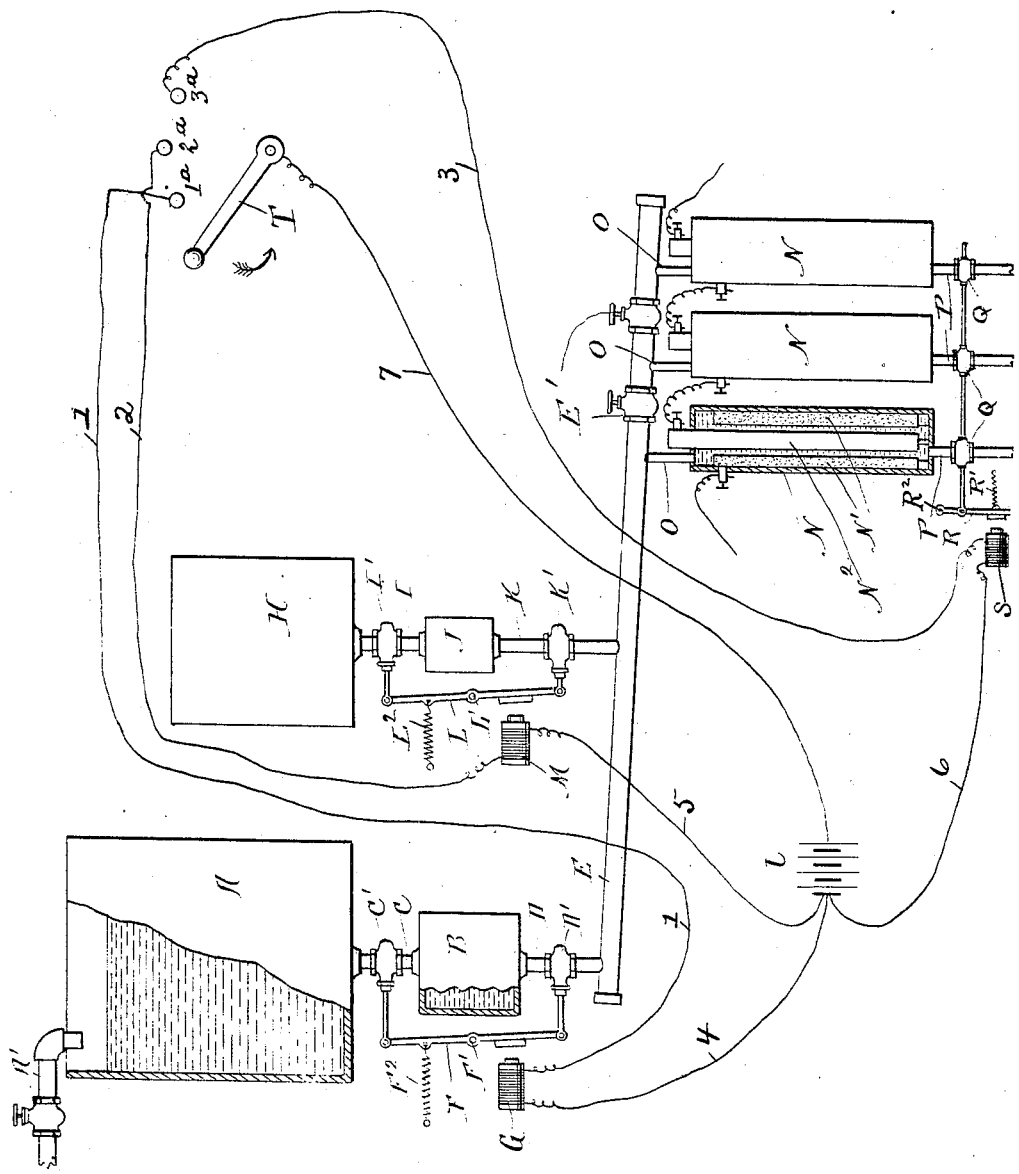
Witnesses
H. B. Hallock
E. R. Stilley
Inventor
Isidor Kitsee

UNITED STATES PATENT OFFICE.

ISIDOR KITSEE, OF PHILADELPHIA, PENNSYLVANIA.

ELECTRIC CELL.

No. 827,917.  Specification of Letters Patent.  Patented Aug. 7, 1906.

Application filed February 20, 1904. Serial No. 194,547.

*To all whom it may concern:*

Be it known that I, ISIDOR KITSEE, of the city and county of Philadelphia, State of Pennsylvania, have invented certain new and useful Improvements in Electric Cells, of which the following is a specification.

My invention relates to an improvement in electric cells. Its object is to produce cells of an efficient and economical type.

As is well known, the greatest difficulty in the employment of primary cells lies in the depolarization of the negative element. More specially is this the case if the primary batteries are to be used for a greater length of time, and it is well known that in a primary battery the depolarizing compound of which is dissolved in the liquid the positive or zinc element will be attacked even if the battery is out of action.

The aim of my invention is to produce a cell wherein at the required time the required amount of electrolyte can be supplied and wherefrom the electrolyte, after having been used, can be removed and, if necessary, replaced by the necessary amount of new electrolyte.

It is also the aim of my invention to equip said cell with an arrangement whereby the same can be flushed or cleaned out, so that for each new use the electrodes will present clean surfaces, and wherein, in fact, for all practical purposes the battery during the time it is not in operation is entirely, or nearly so, void of all the electrolyte, thereby avoiding local action, which otherwise would set in.

Referring to the drawing, which illustrates in a partial diagrammatic and partial sectional view my invention, including mechanical and electrical parts, in preferred form, A is a reservoir containing water or water charged with appropriate chemicals. A' is a means for supplying this tank with water. B is a second reservoir connected with the reservoir A through the pipe C; but whereas the reservoir A may be of any suitable dimensions the reservoir B should be only large enough to contain liquid necessary to fill the jars, wherein the elements are contained, to the necessary height. It is therefore understood that the reservoir B should be of a size smaller than the reservoir A, for it is contemplated to fill the cells repeatedly through the reservoir B, this reservoir receiving its supply from the reservoir A. The reservoir B is connected through pipe D with the distributing-pipe E, having outlets O, each connected to one battery, in a manner so that if the liquid is flowing from B through D, E, and O the receptacles N, containing the elements N' and N², which comprise the different batteries, are simultaneously and proportionately filled with the liquid to the required amount.

The pipe C of the receptacle A is provided with the valve C', and the pipe D of the receptacle B is provided with the valve D'. These two valves are operatively joined together by the bar F, pivoted at F' and held in a position so that normally the valve C' is opened and the valve D' is closed by the spring F². Normally, therefore, the liquid of the tank A will flow into tank B, filling the same; but no liquid will flow out of the tank B, because its own valve is closed. I have also provided a reservoir or tank H, which is filled with a material designed to serve as the depolarizer, and a material designed to produce out of the water a suitable electrolyte, if said water is not charged with appropriate chemicals. It is preferred that these materials should consist of sulfuric acid having dissolved therein a bichromate, such as potassium or sodium, and if the positive element of the primary cell consists of zinc it is preferred that a slight addition of a mercury salt, such as bisulfate of mercury, shall be added to this liquid for the purpose of amalgamating this zinc, and thereby stopping the local action otherwise ensuing; but it is obvious that other materials may be used.

The tank H is preferably made of a dimension smaller than the dimension of the tank A, for the reason that each filling of the cells N requires a far smaller amount of liquid from the tank H than it requires from the tank A, and I prefer that the proportions should be about one to ten.

To the tank H is connected, by pipe I, the tank J. This tank J has to be of a dimension smaller than the tank H, for the reason that whereas the tank H has to carry liquid enough for a series of fillings of the cells the tank J should only have a capacity for liquid enough for the depolarization of the cells for a proposed length of time, and as this liquid should be, as said above, in the proportion of about one part to ten parts of water it is obvious that the capacity of the tank J should be only about one-tenth of the capacity of the tank B. The tank J is connected by pipe K with the distributing-pipe E. The pipe I is provided with the valve I', and the pipe K is provided with the valve K'. These two valves are operatively connected together in the same manner and for the same purpose as the valves C' and D' are connected. The connecting-bar between I' and K' is designated by the letter L and is pivoted at L' and held in a position so that normally the valve I' is opened and the valve K' is closed by means of the spring L². As in the former case, it is also obvious here that the smaller tank J is normally filled with the liquid from the tank H; but this liquid is prevented from flowing out of this tank J by the closed valve K'.

As elements for the cells N, I prefer to use a carbon preferably in the shape of a tube and the zinc preferably in the shape of a solid cylinder. The lower ends of the cells N are provided with the outlet-pipes P, normally closed through the valves Q. These valves are connected together, and their terminal is secured to the lever R, pivoted at R² and provided with the spring R' in a manner so that in the normal position of the lever R the valves Q are closed. We therefore have normally—that is, if the batteries are not in use—the following arrangement and disposition of the different parts: The tank A is filled, or nearly so, with water and communicates with the tank B, which is thereby also filled with water. The tank H is filled, or nearly so, with the depolarizing material and, if necessary, the material to produce the electrolyte out of the water of the tank A, and this tank H communicates with the tank J, thereby filling the same with part of its contents. The cells N, with their elements N' and N², are void of any electrolyte. For the purpose of making operative the cells and elements contained therein I have provided the following arrangement: In juxtaposition to the bar F is placed the electromagnet G, the armature of which is made part of or secured to this bar. One terminal of this electromagnet is connected through wire 4 with the source of current U and through wire 1 with the contact 1ᵃ. In juxtaposition to the bar L is placed the electromagnet M, the armature of which is secured to or made part of this bar. One terminal of this electromagnet is connected through wire 5 with the source of current U, and the other terminal is connected through wire 2 with the contact 2ᵃ. In juxtaposition to the bar or lever R is placed the electromagnet S, the armature of which is secured to or made part of said lever. One terminal of this electromagnet is connected through wire 6, with the source of current U and the other terminal through wire 3 with the contact 3ᵃ.

The second pole of the source of current U is connected through wire 7 with the movable contact lever or arm T. If it is now desired to put the cells N into use, it is only necessary to first contact the lever T with the contact 1ᵃ. This will result therein that through the energizing of the electromagnet G that part of the lever F to which the armature is secured will be drawn toward the core of the electromagnet, thereby opening the valve D' simultaneously with the closing of the valve C'. The communication between the tanks A and B will therefore be cut off, and the liquid from the tank B will be allowed to flow into the distributing-pipe E and from the same through the pipes O into the different cells N. After a short interval the contact-arm T is moved from the contact 1ᵃ to the contact 2ᵃ, thereby demagnetizing the magnet G and energizing the electromagnet M, the result of which is that that part of the bar L to which the armature of this particular electromagnet is attached is drawn toward it, opening the valve K' simultaneously with the closing of the valve I'. Communication between the tanks H and J is therefore cut off, and the contents of J are allowed to flow into the distributing-pipe E and then through the pipes O into the cells N, thereby giving the liquid in same the necessary conductivity and necessary depolarizing quality. The cells N are now ready for use. After having used these cells for the time desired the arm T is contacted with the point 3ᵃ, and this movement results therein that through the energizing of the electromagnet S that part of the lever R to which its armature is secured is drawn toward it, thereby opening the valves secured to this lever. The liquid contained in the cells N is allowed to flow out of the cells, and if it is desired to clean these cells entirely the arm T is again brought in contact with the point 1ᵃ, thereby allowing the water of the tank B to flush out the cells N. In this case the arm 1 shall be brought back to the stop 3ᵃ by moving the same in the direction of the arrow.

It is preferred that the depolarizing fluid shall have a capacity for a restricted period of time—one-half or one hour, as the case may be—for the reason that if the capacity of the liquid from J should be made to serve for a comparatively great length of time and the continuous use of the cells be suspended for one reason or another the extra capacity of the depolarizer would be lost, and to prevent the undue loss of same it is preferred that each charge should only be for a short period, and if the continuous use of this cell for a longer period is contemplated then the refilling of the cells should be repeated. If it is contemplated to use these cells for such purposes—as, for instance, the actuating of electromagnets for automatically-played pianos and organs—then the cells, with their reservoirs, may be placed in the cellar or other convenient space and only the switching arrangement need be placed where the player or person in charge is present. In this case the source A' can be the water-supply as is usually provided for in dwellings; but when it is desired to use this arrangement with moving vehicles, such as automobiles, then the source A' should be connected to any source of water-supply on the road of travel, and it is preferred in such cases that the switching device should be placed near the person in charge of the vehicle.

I have illustrated and described the tank A as to contain water, for the reason that it is more convenient to get a supply of plain water than to get a supply of water charged with a chemical; but it is obvious that the tank, or the water for same, may contain a chemical useful for the purpose intended. Wherever, therefore, I use the word "water" in this specification or in the claims following this specification I do not understand under it plain water alone, but also include in this term water charged with a chemical adapted to make the plain water more conducting. As such a chemical common table-salt (chlorid of sodium) may advantageously be used. In this case the depolarizing liquid does not need to contain a free acid, as would otherwise be necessary.

I have illustrated in the drawings the distributing-pipe as to be provided with hand-valves E'—this for the reason that should it be desired to cut out one or more of the end cells it is only necessary to stop the flow of the liquid to such cell, and this can be best accomplished with the aid of the hand-valves.

Having now described my invention, what I claim as new, and desire to secure by Letters Patent, is—

1. An electric plant consisting of a series of voltaic cells of the one-fluid type, said cells provided with inlets and outlets, the inlets connected to a common distributing-pipe provided with hand-valves, said distributing-pipe connected to two reservoirs, one reservoir containing the electrolyte and the second reservoir containing the depolarizing fluid, each of said reservoirs provided with electromagnetic valves, a circuit for each of said valves, and a switch common to all of said circuits, the outlet means of said cells also provided with electromagnetic valves adapted to be actuated by said common switch, and a source of current common to all of said circuits.

2. An electric battery comprising a series of electric cells, electrically connected with each other, the receptacle of each of said cells provided with inlet and outlet, the inlets connected to a common distributing-pipe, two reservoirs connected to said distributing-pipe, one reservoir containing the depolarizing liquid and one reservoir containing the liquid necessary for the electrolyte, each of said reservoirs provided with a valve normally closed, and electromagnetic means in proximity to said valves adapted to open and close said valves through the operation of a circuit of which said electromagnetic means are part, the outlets provided each with a valve, said valve normally closed, and means, electromagnetic in their action, to simultaneously open and close said valves through the operation of a circuit of which said electromagnetic means are part.

3. An electric plant embracing a series of electric cells normally void of electrolyte, a reservoir containing the necessary electrolyte, distributing means connected to the reservoir and cells respectively, means between said reservoir and distributing means adapted to open and close communication between said reservoir and distributing means, an outlet for each of said cells and means to open and close said outlet in combination with electromagnets adapted to operate said distributing means and outlet means, the circuits of said electromagnets adapted to be opened and closed through one common switch.

4. An electric plant embracing a reservoir adapted to be filled with one liquid, said reservoir connecting with a smaller reservoir, a second reservoir adapted to be filled with a second liquid and in communication with a smaller reservoir, a distributing-pipe and primary cells in operative relation thereto, said cells normally void of any electrolyte, electromagnetic means to cut off the communication of the first-named reservoir and its smaller adjunct simultaneously with the making of the communication between the smaller adjunct and the distributing-pipe, electromagnetic means to cut off the communication between the second reservoir and its smaller adjunct simultaneously with the making of the communication between said smaller adjunct and the distributing-pipe, outlet-pipes for the primary cells, electromagnetic means to operate said outlet-pipes and mechanical means to make operative one of said electromagnetic means.

In testimony whereof I hereby sign my name, in the presence of two subscribing witnesses, this 6th day of March, A. D. 1903.

ISIDOR KITSEE.

Witnesses:
 EDITH R. STILLEY,
 H. C. YETTER.